Patented Dec. 18, 1934

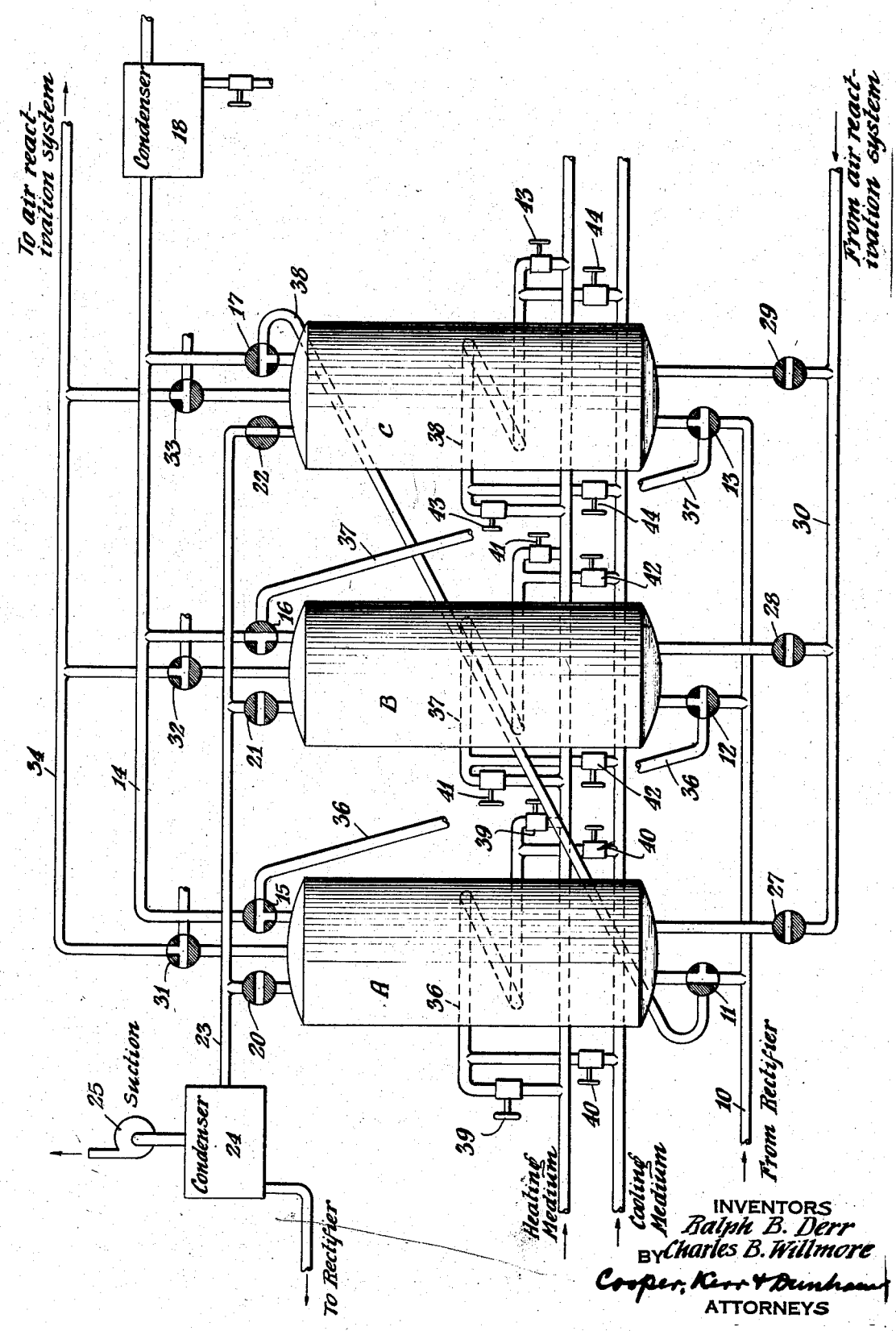

1,985,204

UNITED STATES PATENT OFFICE 1,985,204

PRODUCTION OF ANHYDROUS AND ABSOLUTE ALCOHOLS

Ralph B. Derr, Oakmont, and Charles B. Willmore, New Kensington, Pa., assignors to Aluminum Company of America, Pittsburgh, Pa., a corporation of Pennsylvania Application May 28, 1932, Serial No. 614,218

5 Claims. (Cl. 202—68)

The present invention has as a principal object to provide an improved method and means for the commercial production of anhydrous and absolute ethyl alcohols. A further object is to provide a continuous process for the removal of water from ethyl alcohol, which can be carried on for indefinite periods without more than brief interruption. The invention relates particularly to methods of the type in which alcohol vapors are passed through a bed or body of desiccating material, and in one of its broader aspects the invention consists in removing moisture by adsorption in activated alumina, by which is meant material the active adsorbing portion of which is composed of aluminum hydrate which has been calcined at a temperature between 300° and 800° C., preferably at about 350° C., and which, by reason of the partial dehydration caused by such calcination, is highly adsorptive and/or absorptive. The product of the calcination can be readily reactivated after use by heating to temperatures of 150° to 175° C., and it retains its form with repeated use and reactivation over long periods. Activated alumina "scale" is the preferred form of this material, said activated alumina scale being produced by the calcination of massive aluminum hydrate, for instance hydrate such as is deposited from a sodium aluminate solution in the form of scale in the alumina precipitation tanks during the practice of the Fickes-Sherwin modification of the Bayer process which has long been used in the United States for the production of purified alumina. For use as an adsorbent the material is broken or crushed, preferably to a coarsely granular condition.

In the course of experimentation on the removal of moisture from ethyl alcohol it has been found that activated alumina is notably superior to the adsorbents heretofore suggested for the purpose. It has also been found that for adsorbing moisture from alcohol vapor activated alumina is markedly improved by impregnation with salts possessing certain properties hereinafter described. Further, it has been determined that activated alumina scale is superior to other types of activated alumina for the purpose mentioned. When these materials are formed into an adsorbing bed and the vapors of ethyl alcohol are distilled over or through the bed, care being taken at all times to avoid temperatures which will lead to chemical change of the alcohol, it is possible to produce, in commercial quantities, and by a continuous and economic process, anhydrous and absolute ethyl alcohol. An important advantage of the invention is that the result stated may be accomplished without the further use of supplementary desiccating processes, thus effecting a further economy in commercial operation.

Alcohols other than ethyl alcohol may be dried and produced in a substantially anhydrous state by the use of activated alumina in a similar manner, but the properties of the activated alumina render it peculiarly suitable for application to the drying of ethyl alcohol, the drying of which is attended with considerably greater difficulty than the drying of other alcohols. As the process is particularly designed for use for the production of absolute or anhydrous ethyl alcohol, it will be described in detail in this connection. However, the invention is not to be considered as limited to use only in the treatment of ethyl alcohol.

The term "absolute alcohol" is used herein to designate alcohol which contains less than 1 per cent of water and is intended to include both pure alcohol and alcohol containing such small amounts of impurities as may be used as denaturants. By the term "anhydrous alcohol" is meant alcohol substantially completely free from water. By prior processes absolute and anhydrous alcohols are difficult to manufacture commercially, but the difficulties encountered in the manufacture of absolute alcohol are greatly accentuated in the case of anhydrous alcohol; and while the method of the present invention relates to both, it is by reason of its efficiency particularly adapted to the production of anhydrous alcohol in commercial quantities.

To the end that the invention may be readily understood reference will be had to the accompanying drawing in which is illustrated diagrammatically an apparatus which may be used with advantage in the practice of the invention.

Referring to the drawing, colums A, B, C, containing the activated alumina, are connected by pipe 10 and two-way valves 11, 12, 13, with a rectifier (not shown) and by pipe 14 and two-way valves 15, 16, 17 with a condenser 18, so that by proper positioning of the valves the alcohol vapors coming from the rectifier may be passed through any two of the adsorbing columns and thence to the condenser mentioned, while the other column is cut out of the system for purposes hereinafter explained. The columns are also connected through one-way valves 20, 21, 22, and pipe 23 with a condenser 24 and vacuum pump 25, and they are also connected by one-way valves 27, 28, 29, and pipe 30, and two-way valves 31, 32, 33, and pipe 34, in an air reactivation system which includes any suitable means (not shown) for supplying air heated to a suitable temperature, usually about 150° to 175° C., and for supplying cool dry air for cooling the reactivated alumina in the towers to the proper temperature for further use. Auxiliary heating and cooling means may be provided, preferably in the form of coils of pipe 36, 37, 38 in the adsorbent columns, connected through valves 39, 40, 41, 42, 43, 44 with hot and cold water pipes so that either medium may be passed through any coil or coils at will whereby the contents of the columns may be brought to and/or maintained at a desirable temperature.

In practicing the process of the present invention in the preferred manner the adsorbent columns are filled with the solid adsorbent, preferably activated alumina scale. From the rectifier the ethyl alcohol vapor which is to be treated enters the system through pipe 10 and passes through valve 11 into column A, under atmospheric pressure or just enough above to insure a positive flow of the vapor. The first portion of vapors coming from the column is completely anhydrous and may, if desired, be passed through pipe 14 and valve 15 directly to a condenser 18. In commercial operation, however, and in order to obtain maximum efficiency, it is preferable to pass all the vapors through two or more adsorbing beds, as the intensive drying power of the adsorbent in the first bed is usually exhausted before its total adsorptive capacity is used up, and by passing partially dried vapors from the first bed to the second bed of adsorbent the portion of the alcohol vapors which is not completely dried in the first bed will be rendered anhydrous in the second bed without materially decreasing the adsorbing power of the latter. Consequently, in commercial operation the path of the vapors from column A is through valve 15, pipe 36 and valve 12 into column B and thence through valve 16 and pipe 14 to condenser 18 where completely anhydrous alcohol or absolute alcohol, as desired, is obtained. In the meanwhile column C, which for purposes of illustration may be considered as having had its adsorptive capacity exhausted, is completely shut off from the vapor system by means of valves 13 and 17 and is connected with the activating system.

In the reactivation of an adsorbent column, in this instance column C, the vacuum produced by means of pump 25 and condenser 24 is first applied to the adsorbent bed through pipe 23 and valve 22 while the valves 29 and 33 are kept closed. Substantially all of the alcohol held by the adsorbent will be thus removed with a part of the adsorbed water, and this mixture is returned to the rectifier through condenser 24 to prevent any substantial loss of alcohol vapors. After the major portion of the alcohol in the column has been removed therefrom, valve 22 is closed and hot air is passed into the adsorbent column from pipe 30 through valve 29, which has been opened for the purpose by a quarter-turn, thus removing the moisture from the adsorbent. The moisture-laden air is permitted to escape to the atmosphere through valve 33, which is given a half-turn from the position shown. The bed is then cooled to the desired temperature by recirculating cold dry air through the bed through valves 29 and 33 and pipes 30 and 34. When the adsorptive capacity of column A has been exhausted by the passage of vapors to a point beyond which further use is undesirable valves 11 and 15 are closed and vapors from the rectifier are passed through valve 12 into column B, thence through valve 16, pipe 37 and valve 13 into reactivated column C and then through valve 17 to the condenser 18. Column A is then reactivated as above described for column C, after which the vapors from the rectifier may be passed through column C, pipe 38 and column A, while adsorbent in column B is being reactivated. The beds in use may therefore be said to "progress" in ring or circular fashion, and it is to be understood that the beds so used are not limited to any particular number, though two have been found to be, in general, adequate for the continuous production of anhydrous and absolute alcohols. With more beds available, the number in use at a time may be increased. For example, with four beds the vapors may be passed through two or three of the four, as desired, the two or one not in use undergoing reactivation in the meantime, preparatory to re-use in the system.

Using activated alumina as the adsorbent and passing ethyl alcohol vapors through the bed, as by the process herein schematically shown and above described, control of the temperature of the adsorbing bed and maintenance of the bed at the highest efficiency is readily obtained by regulation of the rate of delivery of the vapors to the bed, sometimes with the aid of the auxiliary heating and cooling means. The temperature of the adsorbent bed is preferably maintained at or above the saturation temperature of the vapors under treatment, i. e. at a temperature sufficient to prevent substantial condensation of the alcohol vapors, and below a temperature at which a substantial chemical change of the ethyl alcohol takes place, this latter temperature seldom exceeding 130° to 135° C. Temperatures within this range may be maintained in major part by the heat of adsorption of the moisture and the small amount of alcohol vapors taken up by the activated alumina adsorbent. It has been found that when the moist alcohol vapors first come in contact with a freshly reactivated bed of activated alumina there results an immediate, rapid and relatively large rise in the temperature of the bed due to the heat of adsorption of the vapors in the activated alumina. This rise in temperature is, however, neither so large nor so rapid as that encountered with certain other adsorbents and the initial rise in temperature lasts for only a relatively short time. The passage of further amounts of vapor through the adsorbent generally supplies sufficient heat of adsorption to just about maintain the temperature reached. By adjustment of the initial temperature it is usually possible to bring the bed to operating temperature and maintain that temperature without the necessity of much, if any, heating or cooling from external sources. A substantial economy in operation may thus be obtained by the use of activated alumina adsorbent in this method.

Activated alumina, because of the selectivity and intensity of its adsorbing power as well as its high adsorptive capacity, is particularly efficient for use in the drying of ethyl alcohol vapors. The selectivity of the activated alumina adsorbents comprehends the property of these adsorbents to preferentially adsorb moisture from alcohol vapors without adsorption of large amounts of the vapors themselves. The amount of alcohol held by the adsorbent in this process is thus quite small and a greater yield of improved product is obtained by the use of activated alumina than has heretofore been possible. The adsorptive intensity of activated alumina may be defined as the property of the adsorbent which enables it to adsorb moisture from the alcohol vapors when the amount present therein is very small. More complete drying of the vapors is obtained by the high intensity of the adsorbing power of activated alumina, permitting the production of anhydrous or absolute alcohol by a single treatment with such adsorbents. The large capacity of the activated alumina adsorbents renders their use in a process of the type described both economical and efficient by increasing the amount of vapor which may be dried before reactivation of the adsorbent becomes necessary.

In further experimentation with processes of distilling alcohol vapors through activated alumina beds it has been found that the efficiency of the material may be markedly increased if the activated alumina is impregnated with certain hygroscopic salts. The accumulation of moisture in activated alumina adsorbents tends toward the saturation and/or neutralization of the forces which cause adsorption and decreases the intensity of the adsorptive power of these materials; consequently as the process proceeds the activated alumina will adsorb progressively less of the moisture content of the vapors as the moisture content of the adsorbent approaches its total capacity. It is necessary, therefore, to reactivate the adsorbent relatively frequently in order to maintain the efficiency of the process, particularly in the production of anhydrous alcohol. On the other hand the impregnation of the activated alumina with certain hygroscopic salts will, it has been determined, increase the capacity of the material at high adsorptive intensity, thus diminishing the frequency of reactivation without decreasing the power of the activated alumina to selectively adsorb moisture from the alcohol vapors. The benefits of impregnation are particularly noted when activated alumina scale is the material impregnated, and in the preferred practice of the process impregnated activated alumina scale is to be desired since this novel adsorbent combination has outstanding properties.

The hygroscopic salts above referred to are that certain class which have an affinity for water, such as, for example, those that take up water by hydration at and above the boiling temperature of the ethyl alcohol to be treated; which are chemically inert to ethyl alcohol, and enter into no reaction with the alcohol as a catalyst or otherwise at the temperature of the process; which are not substantially decomposed by moisture or ethyl alcohol vapor at the temperature of the process or at the temperature at which the adsorbent is reactivated; and which can be substantially dehydrated at or below the reactivation temperature of activated alumina. Among such hygroscopic salts are potassium carbonate, potassium fluoride, and manganese sulfate. Of these salts, and with reference to the processes herein described, potassium carbonate is to be preferred.

The activated alumina may be impregnated with such salts by steeping the material in a solution of the salt, preferably for several hours. The impregnated alumina is then dried and by heating to temperatures of about 150° to 175° C. moisture is removed therefrom and an activated product is produced. The amount of salt deposited on and in the activated alumina will vary with the particular salt used and the concentration of the impregnating solution. In general satisfactory results are obtained by using solutions containing 5 to 20 per cent by weight of the salt.

A striking advantage in the use of activated alumina for removing water from alcohol is found in its high adsorbent capacity at 100 per cent efficiency, that is, its capacity for removing all of the moisture from the alcohol vapors passing through the bed. This capacity is greatly increased by the impregnation just described. For example, in treating alcohol with unimpregnated activated alumina, all the moisture can be removed from the alcohol until the alumina has adsorbed moisture to the amount of 1 per cent of its own weight, but when the alumina is impregnated with a salt such as potassium carbonate the adsorbent capacity at 100 per cent efficiency is 1.8 to 2.0 per cent, in other words about double that of the unimpregnated material.

The intensity of the adsorbing power of the activated alumina and its total adsorptive capacity decreases as the temperature of the adsorbing bed is increased above the saturation temperature of the alcohol vapors, and the process is therefore preferably carried out at temperatures as low as are practical within the range prescribed, having in mind the possible and undesirable condensation of the ethyl alcohol vapors in the bed. The hygroscopic property of the salts with which the activated alumina is impregnated in the preferred practice also varies at different temperatures, and within the class prescribed certain salts are to be given preference according to how large an operating temperature range of highest efficiency is made possible by their use. For example, of the salts specifically named herein, potassium carbonate is to be preferred since activated alumina impregnated with this salt will operate at high efficiency over a wider range than potassium fluoride. It will be understood, however, that in any case the operating temperature should be within a range defined on the one hand by the saturation temperature of the vapors under process and on the other hand by the temperature at which chemical change of the alcohol takes place.

While the invention has been described with specific reference to the preferred operating and other details it will be understood that the invention is not limited thereto except as defined in the appended claims.

The use of activated alumina in the process described is not claimed broadly herein but is claimed in another application.

We claim:

1. Method of producing anhydrous and absolute alcohols, comprising passing ethyl alcohol vapors containing moisture through a bed of highly adsorptive alumina which has been activated by calcining at a temperature between 300° and 800° C. and which has been impregnated with a hygroscopic salt.

2. Method of producing anhydrous and absolute alcohols, comprising passing ethyl alcohol vapors containing moisture through a bed of highly adsorptive alumina which has been activated by calcining at a temperature between 300° and 800° C. and which has been impregnated with potassium carbonate.

3. Method of producing anhydrous and absolute alcohols, comprising passing ethyl alcohol vapors containing moisture through a bed of highly adsorptive alumina which has been activated by calcining at a temperature between 300° and 800° C. and which has been impregnated with potassium fluoride.

4. The method of producing anhydrous and absolute alcohols, comprising passing ethyl alcohol vapors containing moisture through a bed of highly adsorptive alumina which has been activated by calcining at a temperature between 300° and 800° C. and which has been impregnated with manganese sulfate.

5. In the production of anhydrous and absolute alcohols, passing ethyl alcohol vapors containing moisture through a bed of highly adsorptive alumina which has been activated by calcining at a temperature between 300° and 800° C. and which has been impregnated with a hygroscopic salt and maintaining the temperature of said bed above the saturation temperature of said vapors with respect to the alcohol component thereof but below the temperature at which substantial chemical change of the alcohol occurs.

RALPH B. DERR.
CHARLES B. WILLMORE.